United States Patent [19]
Bach et al.

[11] Patent Number: 5,475,686
[45] Date of Patent: Dec. 12, 1995

[54] METHOD AND APPARATUS FOR TRANSFERRING DATA IN A COMMUNICATION SYSTEM

[75] Inventors: Michael J. Bach, Niles; William R. Bayer, Palatine, both of Ill.

[73] Assignee: Motorola, Inc., Schaumburg, Ill.

[21] Appl. No.: 997,997

[22] Filed: Dec. 28, 1992

[51] Int. Cl.[6] ................................................ H04J 3/22
[52] U.S. Cl. ............................................. 370/84; 370/112
[58] Field of Search ............................. 370/56, 84, 95.3, 370/109, 53, 77, 79, 99, 58.1, 58.2, 66, 69.1, 120, 112, 84, 43

[56] References Cited

U.S. PATENT DOCUMENTS

| | | | |
|---|---|---|---|
| 4,504,943 | 3/1985 | Nagano et al. | 370/84 |
| 4,631,720 | 12/1986 | Koeek | 370/84 |
| 4,689,783 | 8/1987 | Kaczerowski | 370/56 |
| 4,852,090 | 7/1989 | Borth | 370/95.3 |
| 4,949,339 | 8/1990 | Shimada et al. | 370/84 |
| 5,001,711 | 3/1991 | Obana et al. | 370/84 |
| 5,020,053 | 5/1991 | Ishikawa et al. | 370/84 |
| 5,111,454 | 5/1992 | Hung et al. | 370/95.3 |
| 5,157,651 | 10/1992 | Ghelberg et al. | 370/84 |
| 5,181,199 | 1/1993 | Motoki et al. | 370/60 |
| 5,243,419 | 9/1993 | Faryar et al. | 370/84 |

OTHER PUBLICATIONS

GSM Recommendation 8.60 ver. 3.1.0 "Inband Control of Remote Transcoders and Rate Adaptors" Jun. 6, 1989 28 pages.
CCITT Recommendation 1.460, "Multiplexing, Rate Adaption and Support of Existing Interfaces", Malaga–Torremolinos, 1984, Amended at Melbourne, 1988, pp. 275–277.

*Primary Examiner*—Douglas W. Olms
*Assistant Examiner*—Huy D. Vu
*Attorney, Agent, or Firm*—Richard A. Sonnentag; Anthony G. Sitko

[57] ABSTRACT

A communication system (101) concentrates the output of variable rate transcoders (XCDRs 203, 206, 209) to realize an increase in T1 Megastream link capacity. Line interface cards (212, 213) multiplex a generic transcoder/rate adapter unit (GTRAU) format to a concentrated transcoder/rate adapter unit (CTRAU) format based on a determined rate of the data being output from the variable rate transcoders (XCDRs 203, 206, 209). An increase in T1 Megastream link capacity is realized by efficiently concentrating full, half, quarter, and eighth rate channels into a single DS0 for transmission over the T1 Megastream.

6 Claims, 6 Drawing Sheets

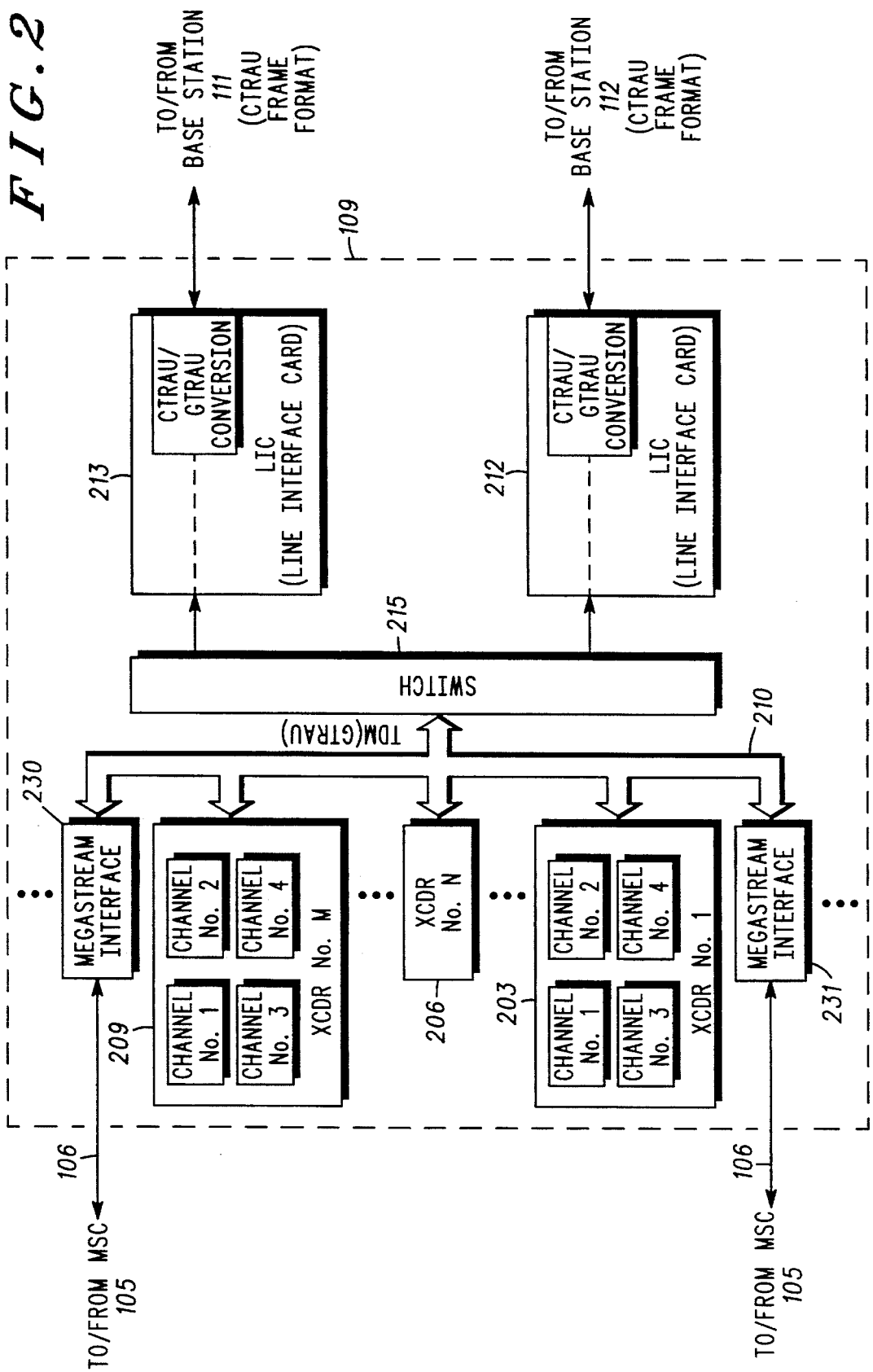

FIG. 4A

|    | 1   | 2   | 3   | 4   | 5   | 6   | 7   | 8   |
|----|-----|-----|-----|-----|-----|-----|-----|-----|
| 0  | 0   | 0   | 0   | 0   | 0   | 0   | 0   | 0   |
| 1  | 0   | 0   | 0   | 0   | 0   | 0   | 0   | 0   |
| 2  | 0   | 0   | 0   | 0   | 0   | 0   | 0   | 0   |
| 3  | 0   | 0   | 0   | 0   | 0   | 0   | 0   | 0   |
| 4  | 1   | M1  | M2  | M3  | A1  | A2  | A3  | A4  |
| 5  | A15 | A26 | A7  | A8  | C1  | C2  | C3  | C4  |
| 6  | C5  | C6  | C7  | C8  | C9  | C10 | C11 | C12 |
| 7  | C13 | C14 | C15 | C16 | C17 | C18 | C19 | C20 |
| 8  | 1   | C21 | D1  | D2  | D3  | D4  | D5  | D6  |
| 9  | D7  | D8  | D9  | D10 | D11 | D12 | D13 | D14 |
| 10 | D15 | D16 | D17 | D18 | D19 | D20 | D21 | D22 |
| 11 | D23 | D24 | D25 | D26 | D27 | D28 | D29 | D30 |
| 12 | 1   | D31 | D32 | D33 | D34 | D35 | D36 | D37 |
| 13 | D38 | D39 | D40 | D41 | D42 | D43 | D44 | D45 |
| 14 | D46 | D47 | D48 | D49 | D50 | D51 | D52 | D53 |
| 15 | D54 | D55 | D56 | D57 | D58 | D59 | D60 | D61 |
| 16 | 1   | D62 | D63 | D64 | D65 | D66 | D67 | D68 |
| 17 | D69 | D70 | D71 | D72 | D73 | D74 | D75 | D76 |
| 18 | D77 | D78 | D79 | D80 | A1  | A2  | A3  | A4  |
| 19 | A5  | A6  | A7  | A8  | C1  | C2  | C3  | C4  |
| 20 | 1   | C5  | C6  | C7  | C8  | C9  | C10 | C11 |
| 21 | C12 | C13 | C14 | C15 | C16 | C17 | C18 | C19 |
| 22 | C20 | C21 | D1  | D2  | D3  | D4  | D5  | D6  |
| 23 | D7  | D8  | D9  | D10 | D11 | D12 | D13 | D14 |
| 24 | 1   | D15 | D16 | D17 | D18 | D19 | D20 | D21 |
| 25 | D22 | D23 | D24 | D25 | D26 | D27 | D28 | D29 |
| 26 | D30 | D31 | D32 | D33 | D34 | D35 | D36 | D37 |
| 27 | D28 | D38 | D39 | D40 |     |     |     |     |
| 28 | 1   |     |     |     |     |     |     |     |
| 29 |     |     |     |     |     |     |     |     |
| 30 |     |     |     | A1  | A2  | A3  | A4  | A5  |
| 31 | A6  | A7  | A8  | C1  | C2  | C3  | C4  | C5  |
| 32 | 1   | C6  | C7  | C8  | C9  | C10 | C11 | C12 |
| 33 | C13 | C14 | C15 | C16 | C17 | C18 | C19 | C20 |
| 34 | C21 | D1  | D2  | D3  | D4  | D5  | D6  | D7  |
| 35 | D8  | D9  | D10 | D11 | D12 | D13 | D14 | D15 |
| 36 | 1   | D16 | D17 | D18 | D19 | D20 | D21 | D22 |
| 37 | D23 | D24 | D25 | D26 | D27 | D28 | D29 | D30 |
| 38 | D31 | D32 | D33 | D34 | D35 | D36 | D37 | D38 |
| 39 | D39 | D40 | D41 | D42 | D43 | D44 | D45 | D46 |

FIG.4B

|    | 1    | 2    | 3    | 4    | 5    | 6    | 7    | 8    |
|----|------|------|------|------|------|------|------|------|
| 40 | 1    | D47  | D48  | D49  | D50  | D51  | D52  | D53  |
| 41 | D54  | D55  | D56  | D57  | D58  | D59  | D60  | D61  |
| 42 | D62  | D63  | D64  | D65  | D66  | D67  | D68  | D69  |
| 43 | D70  | D71  | D72  | D73  | D74  | D75  | D76  | D77  |
| 44 | 1    | D78  | D79  | D80  | D81  | D82  | D83  | D84  |
| 45 | D85  | D86  | D87  | D88  | D89  | D90  | D91  | D92  |
| 46 | D93  | D94  | D95  | D96  | D97  | D98  | D99  | D100 |
| 47 | D101 | D102 | D103 | D104 | D105 | D106 | D107 | D108 |
| 48 | 1    | D109 | D110 | D111 | D112 | D113 | D114 | D115 |
| 49 | D116 | D117 | D118 | D119 | D120 | D121 | D122 | D123 |
| 50 | D124 | D125 | D126 | D127 | D128 | D129 | D130 | D131 |
| 51 | D132 | D133 | D134 | D135 | D136 | D137 | D138 | D139 |
| 52 | 1    | D140 | D141 | D142 | D143 | D144 | D145 | D146 |
| 53 | D147 | D148 | D149 | D150 | D151 | D152 | D153 | D154 |
| 54 | D155 | D156 | D157 | D158 | D159 | D160 | D161 | D162 |
| 55 | D163 | D164 | D165 | D166 | D167 | D168 | D169 | D170 |
| 56 | 1    | D171 | D172 | A1   | A2   | A3   | A4   | A5   |
| 57 | A6   | A7   | A8   | C1   | C2   | C3   | C4   | C5   |
| 58 | C6   | C7   | C8   | C9   | C10  | C11  | C12  | C13  |
| 59 | C14  | C15  | C16  | C17  | C18  | C19  | C20  | C21  |
| 60 | 1    | D1   | D2   | D3   | D4   | D5   | D6   | D7   |
| 61 | D8   | D9   | D10  | D11  | D12  | D13  | D14  | D15  |
| 62 | D16  | A1   | A2   | A3   | A4   | A5   | A6   | A7   |
| 63 | A8   | C1   | C2   | C3   | C4   | C5   | C6   | C7   |
| 64 | 1    | C8   | C9   | C10  | C11  | C12  | C13  | C14  |
| 65 | C15  | C16  | C17  | C18  | C19  | C20  | C21  | D1   |
| 66 | D2   | D3   | D4   | D5   | D6   | D7   | D8   | D9   |
| 67 | D10  | D11  | D12  | D13  | D14  | D15  | D16  | A1   |
| 68 | 1    | A2   | A3   | A4   | A5   | A6   | A7   | A8   |
| 69 | C1   | C2   | C3   | C4   | C5   | C6   | C7   | C8   |
| 70 | C9   | C10  | C11  | C12  | C13  | C14  | C15  | C16  |
| 71 | C17  | C18  | C19  | C20  | C21  | D1   | D2   | D3   |
| 72 | 1    | D4   | D5   | D6   | D7   | D8   | D9   | D10  |
| 73 | D11  | D12  | D13  | D14  | D15  | D16  | A1   | A2   |
| 74 | A3   | A4   | A5   | A6   | A7   | A8   | C1   | C2   |
| 75 | C3   | C4   | C5   | C6   | C7   | C8   | C9   | C10  |
| 76 | 1    | C11  | C12  | C13  | C14  | C15  | C16  | C17  |
| 77 | C18  | C19  | C20  | C21  | D1   | D2   | D3   | D4   |
| 78 | D5   | D6   | D7   | D8   | D9   | D10  | D11  | D12  |
| 79 | D13  | D14  | D15  | D16  |      |      |      |      |

FIG.4C

|     | 1 | 2 | 3 | 4 | 5 | 6 | 7 | 8 |
|-----|---|---|---|---|---|---|---|---|
| 80  |   |   |   |   |   |   |   |   |
| 81  |   |   |   |   |   |   |   |   |
| 82  |   |   | A1 | A2 | A3 | A4 | A5 | A6 |
| 83  | A7 | A8 | C1 | C2 | C3 | C4 | C5 | C6 |
| 84  | 1 | C7 | C8 | C9 | C10 | C11 | C12 | C13 |
| 85  | C14 | C15 | C16 | C17 | C18 | C19 | C20 | C21 |
| 86  | D1 | D2 | D3 | D4 | D5 | D6 | D7 | D8 |
| 87  | D9 | D10 | D11 | D12 | D13 | D14 | D15 | D16 |
| 88  | 1 | D17 | D18 | D19 | D20 | D21 | D22 | D23 |
| 89  | D24 | D25 | D26 | D27 | D28 | D29 | D30 | D31 |
| 90  | D32 | D33 | D34 | D35 | D36 | D37 | D38 | D39 |
| 91  | D40 | A1 | A2 | A3 | A4 | A5 | A6 | A7 |
| 92  | 1 | A8 | C1 | C2 | C3 | C4 | C5 | C6 |
| 93  | C7 | C8 | C9 | C10 | C11 | C12 | C13 | C14 |
| 94  | C15 | C16 | C17 | C18 | C19 | C20 | C21 | D1 |
| 95  | D2 | D3 | D4 | D5 | D6 | D7 | D8 | D9 |
| 96  | 1 | D10 | D11 | D12 | D13 | D14 | D15 | D16 |
| 97  | D17 | D18 | D19 | D20 | D21 | D22 | D23 | D24 |
| 98  | D25 | D26 | D27 | D28 | D29 | D30 | D31 | D32 |
| 99  | D33 | D34 | D35 | D36 | D37 | D38 | D39 | D40 |
| 100 | 1 | A1 | A2 | A3 | A4 | A5 | A6 | A7 |
| 101 | A8 | C1 | C2 | C3 | C4 | C5 | C6 | C7 |
| 102 | C8 | C9 | C10 | C11 | C12 | C13 | C14 | C15 |
| 103 | C16 | C17 | C18 | C19 | C20 | C21 | D1 | D2 |
| 104 | 1 | D3 | D4 | D5 | D6 | D7 | D8 | D9 |
| 105 | D10 | D11 | D12 | D13 | D14 | D15 | D16 |   |
| 106 |   |   |   |   |   |   |   |   |
| 107 |   |   |   |   |   |   |   |   |
| 108 | 1 |   | A1 | A2 | A3 | A4 | A5 | A6 |
| 109 | A7 | A8 | C1 | C2 | C3 | C4 | C5 | C6 |
| 110 | C7 | C8 | C9 | C10 | C11 | C12 | C13 | C14 |
| 111 | C15 | C16 | C17 | C18 | C19 | C20 | C21 | D1 |
| 112 | 1 | D2 | D3 | D4 | D5 | D6 | D7 | D8 |
| 113 | D9 | D10 | D11 | D12 | D13 | D14 | D15 | D16 |
| 114 | D17 | D18 | D19 | D20 | D21 | D22 | D23 | D24 |
| 115 | D25 | D26 | D27 | D28 | D29 | D30 | D31 | D32 |
| 116 | 1 | D33 | D34 | D35 | D36 | D37 | D38 | D39 |
| 117 | D40 | D41 | D42 | D43 | D44 | D45 | D46 | D47 |
| 118 | D48 | D49 | D50 | D51 | D52 | D53 | D54 | D55 |
| 119 | D56 | D57 | D58 | D59 | D60 | D61 | D62 | D63 |

FIG.4D

|     | 1    | 2    | 3    | 4    | 5    | 6    | 7    | 8    |
|-----|------|------|------|------|------|------|------|------|
| 120 | 1    | D64  | D65  | D66  | D67  | D68  | D69  | D70  |
| 121 | D71  | D72  | D73  | D74  | D75  | D76  | D77  | D78  |
| 122 | D79  | D80  | A1   | A2   | A3   | A4   | A5   | A6   |
| 123 | A7   | A8   | C1   | C2   | C3   | C4   | C5   | C6   |
| 124 | 1    | C7   | C8   | C9   | C10  | C11  | C12  | C13  |
| 125 | C14  | C15  | C16  | C17  | C18  | C19  | C20  | C21  |
| 126 | D1   | D2   | D3   | D4   | D5   | D6   | D7   | D8   |
| 127 | D9   | D10  | D11  | D12  | D13  | D14  | D15  | D16  |
| 128 | 1    | A1   | A2   | A3   | A4   | A5   | A6   | A7   |
| 129 | A8   | C1   | C2   | C3   | C4   | C5   | C6   | C7   |
| 130 | C8   | C9   | C10  | C11  | C12  | C13  | C14  | C15  |
| 131 | C16  | C17  | C18  | C19  | C20  | C21  | D1   | C2   |
| 132 | 1    | D3   | D4   | D5   | D6   | D7   | D8   | D9   |
| 133 | D10  | D11  | D12  | D13  | D14  | D15  | D16  |      |
| 134 |      | A1   | A2   | A3   | A4   | A5   | A6   | A7   |
| 135 | A8   | C1   | C2   | C3   | C4   | C5   | C6   | C7   |
| 136 | 1    | C8   | C9   | C10  | C11  | C12  | C13  | C14  |
| 137 | C15  | C16  | C17  | C18  | C19  | C20  | C21  | D1   |
| 138 | D2   | D3   | D4   | D5   | D6   | D7   | D8   | D9   |
| 139 | D10  | D11  | D12  | D13  | D14  | D15  | D16  | D17  |
| 140 | 1    | D18  | D19  | D20  | D21  | D22  | D23  | D24  |
| 141 | D25  | D26  | D27  | D28  | D29  | D30  | D31  | D32  |
| 142 | D33  | D34  | D35  | D36  | D37  | D38  | D39  | D40  |
| 143 | D41  | D42  | D43  | D44  | D45  | D46  | D47  | D48  |
| 144 | 1    | D49  | D50  | D51  | D52  | D53  | D54  | D55  |
| 145 | D56  | D57  | D58  | D59  | D60  | D61  | D62  | D63  |
| 146 | D64  | D65  | D66  | D67  | D68  | D69  | D70  | D71  |
| 147 | D72  | D73  | D74  | D75  | D76  | D77  | D78  | D79  |
| 148 | 1    | D80  | D81  | D82  | D83  | D84  | D85  | D86  |
| 149 | D87  | D88  | D89  | D90  | D91  | D92  | D93  | D94  |
| 150 | D95  | D96  | D97  | D98  | D99  | D100 | D101 | D102 |
| 151 | D103 | D104 | D105 | D106 | D107 | D108 | D109 | D110 |
| 152 | 1    | D111 | D112 | D113 | D114 | D115 | D116 | D117 |
| 153 | D118 | D119 | D120 | D121 | D122 | D123 | D124 | D125 |
| 154 | D126 | D127 | D128 | D129 | D130 | D131 | D132 | D133 |
| 155 | D134 | D135 | D136 | D137 | D138 | D139 | D140 | D141 |
| 156 | 1    | D142 | D143 | D144 | D145 | D146 | D147 | D148 |
| 157 | D149 | D150 | D151 | D152 | D153 | D154 | D155 | D156 |
| 158 | D157 | D158 | D159 | D160 | D161 | D162 | D163 | D164 |
| 159 | D165 | D166 | D167 | D168 | D169 | D170 | D171 | D172 |

5,475,686

METHOD AND APPARATUS FOR TRANSFERRING DATA IN A COMMUNICATION SYSTEM

FIELD OF THE INVENTION

The invention relates generally to data transfer in a communications system and more specifically to data transfer in a cellular radiotelephone system.

BACKGROUND OF THE INVENTION

Current analog and digital communications systems, and more specifically cellular radiotelephone systems, define a fixed-rate link between entities or passing traffic information, and include a mechanism to minimize the timing delay between a transcoder (XCDR) and a base-station (BS). Transcoding is a process which transforms a higher rate "chunk" of traffic information into a lower rate (and subsequently smaller bandwidth) of "transcoded", or rate adapted traffic information. In the cellular radiotelephone systems mentioned above, transcoding is done at a fixed rate. Consequently, the number of channels available in a defined link between the XCDR and the BS is likewise fixed.

However, in a code-division multiple access (CDMA) cellular radiotelephone system, a vocoder which generates variable data rates on a frame by frame basis is utilized. The typical link which passes the transcoded information is a T1 Megastream™ link, which, assuming a data traffic transfer rate of 16 kbits/s, yields 96 channels. Estimates of future 3-sector cell capacity in CDMA cellular radiotelephone systems reach in excess of 150 channels. Assuming these future estimates are accurate, at least two T1 Megastream lengths would be required to supply future 3-sector cells with data traffic information in a CDMA cellular radiotelephone system. However, T1 Megastream links are installed by system operators, and are leased at a price of approximately $3,000–4,000 per month, per link. If at all possible, reduction of the number of T1 Megastream links required to serve a particular configuration in a cellular radiotelephone system is a formidable goal indeed.

If it is assumed that the variable rate coder described above has an average rate around 4800 bit/s, the result is that speech is present half the time [(4.8 K plus control+framing)/16 k=42% of the given bandwidth is occupied]. Therefore, a need exists for an apparatus and method which makes more efficient use of the variable bandwidth between the variable rate vocoder and XCVR's to minimize T1 Megastream link requirements without physically altering the T1 Megastream link.

BRIEF DESCRIPTION OF THE DRAWINGS

FIG. 2 generally depicts a base-site controller (BSC) which may beneficially employ the present invention.

FIG. 4(A–D) generally depicts an exemplary concentrated DS0 frame in accordance with the invention.

DETAILED DESCRIPTION OF A PREFERRED EMBODIMENT

Transcoding is a process which transforms data at a high rate into data at a lower rate (and subsequently smaller bandwidth). The lower rate data is called transcoded, or rate adapted data. Cellular radiotelephone systems, for instance, the Pan European Groupe Special Mobile (GSM) digital cellular system, specifies a protocol to link traffic channels having a predetermined rate between a remote transcoder (XCDR) and base-stations (BSs) 111, 112. In the preferred embodiment, transcoding is performed in the base site controller (BSC) 109 of FIG. 1. Transcoding can equally be performed in BSs 111, 112. Continuing, the above-mentioned link is named the $A_{bis}$ interface which is specified in GSM Recommendation 8.60, Version 3.2.0, Jan. 31, 1990. As specified in GSM Recommendation 8.60, frames have a fixed length of 320 bits (20 ms frames) which are transferred at a 16 kbit/s rate utilizing a transcoder/rate adapter unit (TRAU) format and multiplexed into a 64 kbit/s DS0 using the RA2 rate adaption as specified in CCITT I.460. While time-division multiple access (TDMA) cellular radiotelephone systems such as GSM are inflexible with regard to channel capacity due to the fixed-rate transcoding, code-division multiple access (CDMA) cellular radiotelephone systems may realize capacity gains due to variable rate transcoding on a frame by frame basis.

Figure 1:
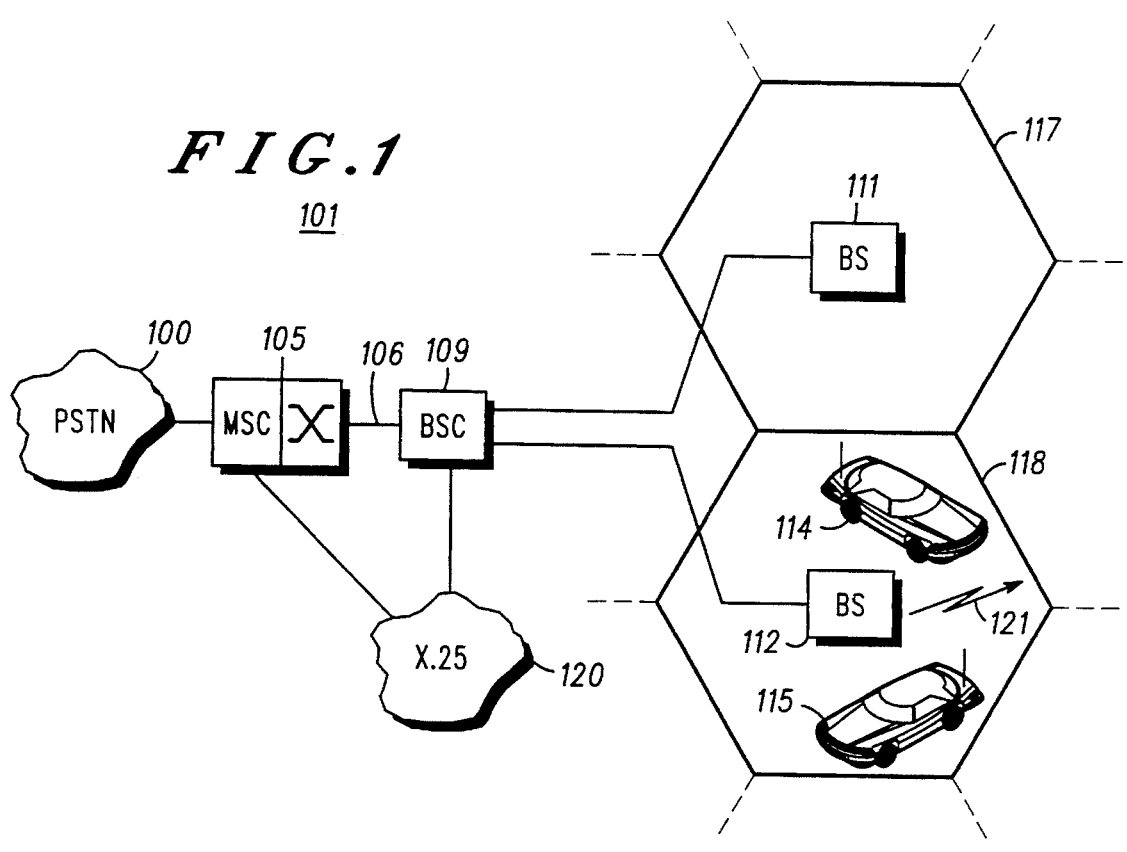
FIG. 1 generally depicts a communication system which may beneficially employ the present invention.

FIG. 1 generally depicts communication system 101 which may beneficially employ the present invention. In the preferred embodiment, the communication system is a code-division multiple access (CDMA) cellular radiotelephone system. As depicted in FIG. 1, a mobile services switching center (MSC) 105 is coupled to a public switched telephone network (PSTN) 100. MSC 105 is also coupled to BSC 109 which performs switching functions similar to MSC 105, but at a location remote with respect to MSC 105. Coupled to BSC 109 are BSs 111, 112, which in the preferred embodiment, are capable of communicating with a plurality of mobile stations. Communication from a BS, and for clarity purposes BS 112, occurs on a downlink of a radio channel 121 to MSs 114, 115.

Referring back to the GSM Recommendation 8.60, of the 320 bits which comprise a frame, 260 bits exist for information traffic (13 K bits/s), 21 for control (1.05 kbit/s), 35 for frame synchronization (1.75 kbit/s), and four for time alignment. To make this frame structure generic for different products, a generic transcoder/rate adapter unit (GTRAU) format has been developed where the number of bits associated with the different types (information traffic, control, synchronization, and alignment) remains the same but the position in the overall frame changes for some of the control bits to improve the timing adjustment procedure. Sending the time alignment bits toward the end of the frame gives the vocoder more of a window of opportunity to make the adjustment. In addition, channel coding has been included for single bit error correction and double bit error detection covering the time alignment bits. The control bits in the GTRAU format remain reserved for future use.

FIG. 2 generally depicts a base-site controller (BSC) 109 which may beneficially employ the present invention. As depicted in FIG. 2, a link 106, which in the preferred embodiment is a T1 Megastream link, carries information to/from MSC 105. The information carried along T1 Megastream link 106 is input into a Megastream Interfaces (MIs) 230, 231 which distributes the information to transcoders (XCDRs) 203, 206, 209. XCDRs 203, 206, 209 contain variable rate vocoders which perform the variable rate transcoding function. Output from XCDRs 203, 206, 209 is data in GTRAU format, which in the preferred embodiment is a first predetermined format, which is transferred to switch 215. Switch 215 couples the data in GTRAU format to line interface cards (LICs) 212, 213. The data in GTRAU format, which employs the framing structure of GSM Recommendation 8.60 but with differing bit assignment, is conveyed to line interface cards (LIC) 212, 213 which multiplex the data from the GTRAU format to a second format, which in the preferred embodiment is a concentrated transcoder/rate adoption unit (CTRAU) format in accordance with the invention. Multiplexing of the GTRAU format into the CTRAU format by LIC's 212, 213, is based on a determined rate of the data of being output from variable rate XCDRs 203, 206, 209. After GTRAU-to-CTRAU format multiplexing, the data is transferred to an element of the communication system of FIG. 1 in the CTRAU format. In the preferred embodiment, an element of the communications system may be base-station 111, 112 during downlink communication or BSC 109 during uplink communication.

Figure 3:
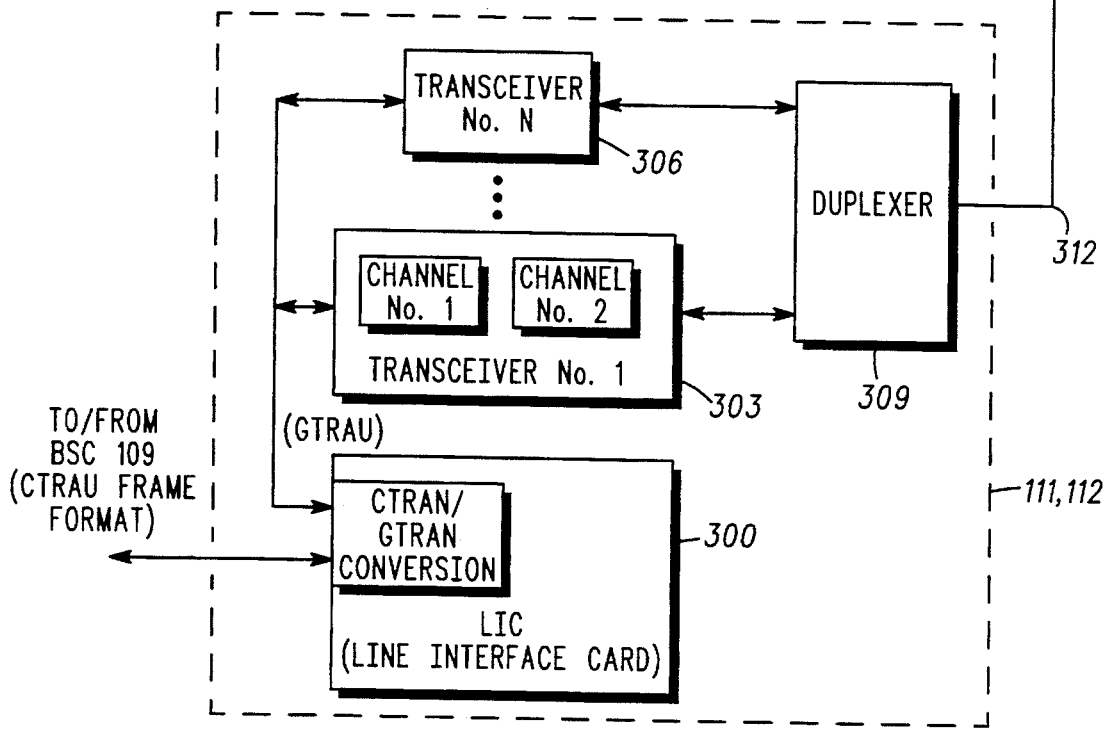
FIG. 3 generally depicts a base-station (BS) which may beneficially employ the present invention.

As shown in FIG. 2, data in the CTRAU format is transferred to/from base-stations 111, 112 in accordance with the invention. Referring now to FIG. 3, there is depicted BSs 111, 112 which demultiplexes the previously multiplexed data from the CTRAU format. Continuing with the above example, data in the CTRAU format enters LIC 300 which demultiplexes the CTRAU format back into the GTRAU format. Data in the GTRAU format is then input into transceivers (XCVRs) 303, 306 which comprise a transmitter, receiver, and associated hardware (not shown). Output from XCVRs 303, 306 is input into a duplexer 309, which is then transmitted to a MSs 114, 115 via antenna 312.

As is apparent from FIG. 2 and FIG. 3, GTRAU framing is still used at the XCDR 203, 206, 209 and the XCVRs 303, 306 themselves. However, a CTRAU format is employed between BSC 109 and BSs 111, 112 in accordance with the invention. FIG. 4 generally depicts one possible CTRAU format in accordance with the invention. As can be seen in FIG. 4, the physical frame structure of a T1 Megastream link has not been altered; only the method of multiplexing data into the frame itself has been altered. In the CTRAU format of FIG. 4 in accordance with the invention, synchronization is based on four leading zero bytes, Octet numbers 0–3, and one's every four bytes, the minimum number of bits necessary for frame synchronization.

As previously mentioned, output from XCDRs 203, 206, 209 is variable. The variability of the rates of the data is in increments of an eighth, consequently XCDRs 203, 206, 209 may output data at an eighth (⅛) rate, quarter (¼) rate, half (½) rate, or full rate. This is a key difference between CDMA cellular radiotelephone systems and TDMA cellular radiotelephone systems; TDMA cellular radiotelephone systems only output full rate and consequently, multiplexing of full rate channels in the physical frame structure of FIG. 4 is always fixed. However, in CDMA cellular radiotelephone systems in accordance with the invention, the variable data rates output from XCDRs 203, 206, 209 may be multiplexed into the physical frame structure of FIG. 4 based on the data rates being output from XCDRs 203, 206, 209.

Referring back to FIG. 4, several differences in the bit assignments are present when compared to the bit assignments in GSM Recommendation 8.60. For example, the number of synchronization bits per DS0 has been reduced from 108 to 71, while the 21 control bits have been maintained. Time alignment bits which are necessary for typical DS0 frames are gone as time alignment is no longer performed at BSs 111, 112. The number of data bits has been reduced from 260 to 172. New bits A1-A8 code the originating time slot associated with the concentrated information. These A bits are used by the receiving side to demultiplex the bits back to the proper time slot assignment for GTRAU termination, and to essentially reverse the CTRAU operation. As can be seen in FIG. 4, 14 channels may be accommodated by the CTRAU frame format in accordance with the invention. As previously mentioned, the number of channels which may be accommodated may be higher or lower, depending on the data rates being output from XCDRs 203, 206, 209. In the example depicted in FIG. 4, the CTRAU frame format supports 7 eighth rate channels, 3 quarter rate channels, 2 half rate channels, and 2 full rate channels. By contrast, a TDMA system employing the GTRAU frame format between BSC 109 and BSs 111, 112 could only provide support of 4 full rate channels. Consequently, in this example, channel capacity of the CDMA cellular radiotelephone system of FIG. I has been increased by approximately 175%. If this CTRAU format were used for every time slot of a T1 Megastream link, the 175% increase in capacity would yield a channel capacity of 168 channels. Consequently, this method would easily support the estimates for future 3-sector cell capacity in CDMA cellular radiotelephone systems of 150+ channels.

A T1 Megastream link carries 24 DS0s, which translates to ninety six 16 k (compressed speech) links or traffic channels. In a CDMA system, the frames present on the T1 traveling to a common cell are generally synchronized in time to each other because the cell air-interface timing is the same for all the channels. However, depending on the trunking scheme used, the individual DS0 delays may vary. Another anomaly occurs during soft handovers where a mobile station communicates to multiple cell sites. In this scenario, the delay must account for the worst case. During soft handover, an assumption might be made that MSs 114, 115 will be in handover with a new target cell adjacent to the source cell. Thus, LICs 212, 213 can measure, during an initialization phase, the worst case delay composed of the longest delayed DS0 for the longest Megastream delay within the group composed of the target cell and its adjacent neighbors. In this way, the timing adjustment which the vocoder residing on the XCDRs 203, 206, 209 must be informed of can occur at LICs 212, 213 and not necessarily at a BS 111, 112. LICs 212, 213 compute the worst case delay of a DS0 to its cell then find the longest delay for the corresponding megastream connected to its neighbors. The overall worst delay then becomes the reference for all future time adjustments for any new channel needing to connect to its cell. In this manner, timing adjustment of bandwidth over the Megastream is unnecessary, and thereby eliminated.

In an alternate embodiment, each DS0 could have dedicated rates from DS0 to DS0. For example, one DS0 in a T1 Megastream would support only full rate channels, while another DS0 in the Megastream would only support half, quarter or eighth rate channels. In this embodiment, the differing rate channels would not be multiplexed into a DS0, but rather each differing rate channel would have a dedicated DS0. In this alternate embodiment, each DS0 could support up to 6 full rate channels, 11 half rate channels, 17 quarter rate channels, and 26 eighth rate channels.

What we claim is:

1. A method of transferring data to an element of a communication system, the data being output from a variable rate vocoder, the method comprising the steps of:

determining a rate of the data output from the variable rate vocoder;

multiplexing the data into a first predetermined format by multiplexing the data into the first predetermined format within a 160-frame T1 frame structure;

multiplexing the data from the first predetermined format to a second format based on the determined rate of the data output from the variable rate vocoder; and transferring the data to the element in the second format.

2. A method of transferring data to an element of a communication system, the data being output from a variable rate vocoder, the method comprising the steps of:

determining a rate of the data output from the variable rate vocoder;

multiplexing the data into a first predetermined format by multiplexing the data into the first predetermined format within a Concentrated Transcoder/Rate Adaptor Unit (CTRAU) frame structure;

multiplexing the data from the first predetermined format to a second format based on the determined rate of the data output from the variable rate vocoder by multiplexing the data from the first predetermined format to a second format within said Concentrated Transcoder/Rate Adaptor Unit (CTRAU) frame structure; and transferring the data to the element in the second format.

3. A method of transferring a plurality of data groups to an element of a communication system, the data groups being output from a corresponding plurality of variable rate vocoders producing data groups having variable sizes, the method comprising the steps of:

accepting a plurality of data groups;

multiplexing a first portion of the plurality of data groups into a first predetermined format;

multiplexing said first portion of the plurality of data groups and a second portion of the data groups into a second format based on the size of the groups in said second portion by multiplexing said first portion of the plurality of data groups and a second portion of the data groups into a second format within a 160-frame T1 frame structure; and transferring the data to the element in the second format.

4. The method of claim 3 wherein said predetermined frame structure further comprises a Concentrated Transcoder/Rate Adaptor Unit (CTRAU) frame structure.

5. An apparatus for transferring data in a communication system, the data being output from a variable rate vocoder, the apparatus comprising:

means for determining a rate of the data output from the variable rate vocoder;

first means for multiplexing the data into a first predetermined format within a 160-frame T1 frame structure;

second means, coupled to said means for determining and said first means for multiplexing, for multiplexing the data from the first predetermined format to a second format based on the determined rate of the data output from the variable rate vocoder; and means, coupled to said second means for multiplexing, for transferring the data in the second format.

6. An apparatus for transferring data in a communication system, the data being output from a variable rate vocoder, the apparatus comprising:

means for determining a rate of the data output from the variable rate vocoder;

first means for multiplexing the data into a first predetermined format within a Concentrated Transcoder/Rate Adaptor Unit (CTRAU) frame structure;

second means, coupled to said means for determining and said first means for multiplexing, for multiplexing the data from the first predetermined format to a second format within said Concentrated Transcoder/Rate Adaptor Unit (CTRAU) frame structure based on the determined rate of the data output from the variable rate vocoder; and means, coupled to said second means for multiplexing, for transferring the data in the second format.

* * * * *